United States Patent [19]

Kawasaki et al.

[11] Patent Number: 4,725,708
[45] Date of Patent: Feb. 16, 1988

[54] METHOD FOR PADDING A COPPER TYPE ALLOY MATERIAL UPON A BASE OF ALUMINUM TYPE METAL USING LASER BEAM OSCILLATING TRANSVERSELY TO ITS TRACKING DIRECTION

[75] Inventors: Minoru Kawasaki; Kazuhiko Mori, both of Toyota, Japan

[73] Assignee: Toyota Jidosha Kabushiki Kaisha, Aichi, Japan

[21] Appl. No.: 885,678

[22] Filed: Jul. 15, 1986

[30] Foreign Application Priority Data

Jul. 17, 1985 [JP] Japan .................. 60-157622

[51] Int. Cl.$^4$ ............................. B23K 26/00
[52] U.S. Cl. ............... 219/121 LD; 219/121 LF
[58] Field of Search ..... 219/121 L, 121 LM, 121 LY, 219/121 LC, 121 LD, 121 EL, 121 ED, 121 LE, 121 LF, 121 EF, 121 EG; 428/650, 652; 427/53.1

[56] References Cited

U.S. PATENT DOCUMENTS

| 3,952,180 | 4/1976 | Gnanamuthu ................ 219/121 LF |
| 4,015,100 | 3/1977 | Gnanamuthu et al. ....... 219/121 LF |
| 4,157,923 | 6/1979 | Yen et al. .................. 219/121 L |
| 4,537,793 | 8/1985 | Kehrer et al. ................ 427/53.1 |

FOREIGN PATENT DOCUMENTS 2740569 3/1978 Fed. Rep. of Germany .
2385810 10/1978 France .

OTHER PUBLICATIONS

Koji Takei, et al., *Journal of Applied Physics*, "Rhenium Film Preparation by Laser Melting", vol. 51, No. 5, May 1980, pp. 2903–2908.

*Primary Examiner*—C. L. Albritton
*Attorney, Agent, or Firm*—Parkhurst & Oliff

[57] ABSTRACT

In this method for padding, a layer of a copper type alloy material in powdered form is laid upon a portion of a base of aluminum type metal which is to be padded. Then a laser beam, concentrated to a spot from about 0.5 mm to about 2.0 mm in diameter with an output density of from about 80 watt/mm$^2$ to about 20,000 watt/mm$^2$, is irradiated upon this layer of powdered copper type alloy material upon the base of aluminum type metal. The laser beam and the base of aluminum type metal are relatively moved in a relative longitudinal direction at a longitudinal speed of from about 100 mm per minute to about 3000 mm per minute; and they are also reciprocatingly moved in a relative direction substantially transverse to the longitudinal direction at an transverse oscillating frequency of above about 80 Hz. Thereby, good padding efficiency is obtained. The copper type alloy material may initially be applied as a powder including a binder and then be dried, before the laser irradiation; or it may be applied automatically substantially during the laser irradiation.

3 Claims, 19 Drawing Figures

METHOD FOR PADDING A COPPER TYPE ALLOY MATERIAL UPON A BASE OF ALUMINUM TYPE METAL USING LASER BEAM OSCILLATING TRANSVERSELY TO ITS TRACKING DIRECTION

BACKGROUND OF THE INVENTION

The present invention relates to a method for overlaying a copper type alloy material as padding material, and more particularly relates to such a method for overlaying a copper type alloy material as padding material upon a substratum of an aluminum type base metal such as aluminum alloy.

The present invention has been described in Japanese Patent Application Serial No. Showa 60-157622 (1985), filed by an applicant the same as the entity assigned or owed duty of assignment of the present patent application; and the present patent application hereby incorporates into itself by reference the text of said Japanese Patent Application and the claim and the drawings thereof; a copy is appended to the present application.

Aluminum type materials such as aluminum alloys are light, having specific gravities approximately one third of iron, and in many fields of art advantage is taken of this lightness by utilizing aluminum type materials in parts, such as automobile and airplane parts. However, the melting point of aluminum type materials such as aluminum alloys is relatively low, being approximately 660° C. at maximum, and accordingly it is not possible to utilize such aluminum type materials such as aluminum alloys for uses which require high thermal resistance. A further problem is that, because these aluminum type materials such as aluminum alloys are generally softer than iron, it is not possible to utilize such materials for uses which have a high abrasion resistance requirement.

Therefore, in order to utilize such aluminum type materials such as aluminum alloys in parts which are required to have good thermal resistance or high abrasion resistance, methods have been advanced according to which layers of materials with superior thermal resistance and abrasion resistance characteristics are joined to or overlaid upon a base of such an aluminum type material such as an aluminum alloy.

Prior art type such methods relating to aluminum type materials such as an aluminum alloys include, among others: (a) resistance welding (spot welding, seam welding, or the like); (b) argon arc welding; and (c) brazing (so called padding). Of these methods, resistance welding and argon arc welding are predicated on the melting of the base aluminum type material such as aluminum alloy. In the earlier history of the art, resistance welding was virtually exclusively employed; however, recently argon arc welding has been introduced. However, the following problems have been experienced with the welding of aluminum type materials such as aluminum alloys:

(1) Aluminum type materials such as aluminum alloys oxidize extremely quickly and easily when subjected to high temperatures, and typically create alumina of relatively high melting point, circa 2700° C. This alumina creates severe handicap to the fusion of the joining portion between the aluminum type material such as aluminum alloy and the overlaid material, and its existence as an impurity in said joining portion causes a deterioration in the strength of the join.

(2) Eliminating the alumina produced as described above in (1) is not easy, and, when a solvent is used for such elimination, a further problem arises in that the solvent must be itself eliminated subsequent to the elimination of the alumina.

(3) Since the thermal conductivity of aluminum type materials such as aluminum alloys is relatively high, it is difficult to concentrate the heat and to effect local heating for welding. Moreover, once the material begins to melt, it melts over a relatively wide area and volume, and adjusting the speed of the welding process becomes difficult.

(4) Because the coefficient of thermal expansion of aluminum type materials such as aluminum alloys is relatively high, the occurrence of cracks and warping is quite likely.

(5) While in the molten condition, aluminum type materials such as aluminum alloys readily absorb hydrogen and/or water vapor, and accordingly a large degreee of gas flawing inevitably occurs.

There arise, therefore, many problems in the welding of such aluminum type materials such as aluminum alloys, and previously it has been virtually impracticable to provide the joining portion between the aluminum type material such as aluminum alloy and the material overlaid thereon with sufficient abrasion resistance characteristic and to treat the same as a functional material. In other words, in treating said joining portion between the aluminum type material such as aluminum alloy and the material overlaid thereon as a functional material, the material composition of said joining portion is extremely important, but in the case of the processes (a) and (b) detailed above the melting and penetration of the aluminum type material such as aluminum alloy is inevitable and indeed is a precondition for the process, and hence the joining portion is composed of an alloy of the overlaid material and the aluminum type material such as aluminum alloy. This alloy layer is inevitably deficient with regard to abrasion resistance and strength in the high temperature region, and hence it can only be utilized in an extremely limited temperature range, for example below about 100° C. Up till the present, it has been considered that this state of affairs is quite natural.

Considering now the case (c) of brazing, although this process is also to some extent subject to the problems outlined in (1) through (5) above, on the other hand brazing does have the advantage that dissimilar materials with dissimilar abrasion, thermal, and corrosion resistance properties can be satisfactorily joined together, without the necessary loss of such properties. However, although brazing does enable the joining together of such dissimilar materials, at least one thereof having superior abrasion resistance and other characteristics, there are problems related to brazing when it is used as a joining process. In other words, because it is a precondition that the aluminum type material such as aluminum alloy utilized as a base material should not be very substantially melted, it has so far been commonly understood that the material utilized for the brazing of a dissimilar material to an aluminum type material such as aluminum alloy should have a melting point very close to or below the melting point of aluminum. As an example even brazing solder as used in the brazing of aluminum type base materials such as aluminum alloys has a comparatively high melting point such as approximately 50° C. higher than aluminum. Accordingly, the use of Ni solder, which has a melting point of roughly 1000° C., is absolutely inconceivable. As a result, even if a dissimilar material of superior thermal resistance, abrasion resistance, and corrosion resistance is joined to the aluminum type material such as aluminum alloy, since the melting point of the brazing solder utilized is relatively low, it has been impossible for the reasons set forth in (a) and (b) above to use the product manufactured in such a manner as a functional material for high temperature applications.

Moreover, considering the brazing or padding of aluminum type materials such as aluminum alloys from the viewpoint of said aluminum type materials, it becomes apparent that materials of high plasticity have comparatively favorable brazability, while on the other hand cast materials and die cast materials have extremely poor brazability. According to this, in the past, brazing has been very difficult.

SUMMARY OF THE INVENTION

The use of laser beams as means for melting only the extreme outer surface of a workpiece, without causing any extensive melting of said workpiece, has been contemplated. Considering this concept of the use of a laser beam, it could be contemplated that a powder of alloy for padding might be delivered to the surface of a piece of aluminum type material such as aluminum alloy, and then this powder could be irradiated by such a laser beam, and it might be envisaged that a padding process would be made practicable which might be easier in comparison with those previously available.

However, a problem arises with such a simple minded approach. Namely, as an example, it is desirable that processing of the extreme outer surface of a piece of aluminum type material such as aluminum alloy for which there is a requirement for high abrasion resistance should be performed over a substantially large width and area. For this reason, a laser beam of a diameter roughly corresponding to the projected surface area is required, and the carrying out of processing with such a laser beam becomes a precondition.

However, the aluminum type material such as aluminum alloy used for the base metal has relatively high thermal conductivity, and readily melts when it is heated, and accordingly there is a great tendency for an alloy layer to be formed, and in such a case alloyization rather than padding occurs.

Moreover, when attempts are made to avoid this alloyization by operating the laser beam at a high processing speed to counter the above explained relatively high thermal conductivity of the aluminum alloy used for the base metal, the cooling speed or solidification speed of the surface formed padding layer is also great as a consequence, and defects such as cracks and blow holes are induced. As a result, this simplistic type of padding method is not able to make full use of the specific characteristics of laser beams.

Accordingly, it is desirable that a padding method should be developed which makes possible the carrying out of overlaying, on the surface of a piece of aluminum type material such as aluminum alloy, of dissimilar materials such as those which have high melting points (approximately 500° C. higher than aluminum) and which have superior thermal resistance characteristics, superior abrasion resistance characteristics, and superior corrosion resistance characteristics, and allows this overlaying to be performed without flaws occurring in the padding portion or the joining portion. A padding alloy such as a copper type alloy which has a high solid solubility with aluminum type materials such as aluminum alloys (approximately 5% by weight) is preferable.

Accordingly, it is the primary object of the present invention to provide a method for padding, suitable for application to a combination of a copper type alloy material and a base of aluminum type metal.

It is a further object of the present invention to provide such a method for padding which does not result in the production of a troublesome quantity of flaws, such as blow holes or cracks or the like.

It is a further object of the present invention to provide such a method for padding which does not require very substantial melting of the base aluminum type metal.

It is a yet further object of the present invention to provide such a method for padding which is easily practiced.

According to the most general aspect of the present invention, these and other objects are attained by a method for padding a copper type alloy material upon a base of aluminum type metal, comprising the steps of: (a) laying a layer of thickness of approximately 0.2 mm to 5.0 mm of said copper type alloy material in powdered form upon a portion of said base of aluminum type metal which is to be padded; (b) irradiating a laser beam, concentrated to a spot from about 0.5 mm to about 5.0 mm in diameter with an output density of from about 80 watt/mm$^2$ to about 20,000 watt/mm$^2$, upon said layer of said powdered copper type alloy material upon said portion of said base of aluminum type metal; (c) relatively moving said laser beam and said base of aluminum type metal in a relative longitudinal direction at a longitudinal speed of from about 100 mm per minute to about 3000 mm per minute; and: (d) relatively reciprocatingly moving said laser beam and said base of aluminum type metal in a relative direction substantially transverse to said longitudinal direction at an transverse oscillating frequency of above about 80 Hz.

In this method according to the present invention for overlaying the powdered copper type alloy padding material over the base of aluminum type metal, it is typical that the melting point of said powdered copper type alloy padding material is about 500° C. higher than that of said base of aluminum type metal, and the oscillating laser light beam, concentrated to a spot from about 0.5 mm to about 5.0 mm in diameter with an output density of from about 80 watt/mm$^2$ to about 20,000 watt/mm$^2$, while being transversely oscillated over said base of aluminum type metal at an transverse oscillating frequency of above about 80 Hz, is further conveyed in the longitudinal direction of the process at a longitudinal speed of from about 100 mm per minute to about 3000 mm per minute; and thereby only the extreme outer layer of the base of aluminum type metal is melted and is combined with the powdered copper type alloy padding material, and thus it becomes possible to satisfactorily overlay said powdered copper type alloy padding material on said base of aluminum type metal, without creating flaws in the padding layer or in the joining portion therefor, and without causing penetration of the base of aluminum type metal. Accordingly, it becomes possible to satisfactorily overlay copper type alloy padding material, which has desirable properties such as superior thermal resistance, superior abrasion resistance, and superior corrosion resistance, on a base of aluminum type metal. Further, as far as the aluminum type metal is concerned, it becomes possible not only to utilize materials of high plasticity, but also materials which are cast or die cast as well, and this expands the range of application of the padding process.

A copper type alloy material approximately substantially composed of, for example, about 15.0% Ni, about 3.0% Fe, about 1.0% P, and remainder substantially Cu, or alternatively substantially composed of, for example, about 20.0% Ni, about 4.5% Fe, about 1.0% P, and remainder substantially Cu, may suitably be utilized as the copper type alloy padding material according to the process of the present invention.

The powdered copper type alloy padding material is applied, according to the above specification for the process of the present invention in a layer of thickness of approximately 0.2 mm to 5.0 mm. The lower limit is set at 0.2 mm because proper abrasion resistance characteristics are not attained if the thickness of the layer of powdered copper type alloy padding material is substantially less than 0.2 mm; and the upper limit is set at 5.0 mm because it becomes impracticable to effect good and uniform padding at a normal laser output power level if the thickness of the layer of powdered copper type alloy padding material is substantially greater than 5.0 mm, and further because it is not required to have said thickness of said powdered copper type alloy padding material layer any greater than 5.0 mm, in order to obtain a proper abrasion resistance characteristic.

The beam diameter of the laser beam is specified to be from about 0.5 mm to about 5.0 mm, according to the above specification for the process of the present invention. The lower limit is set at 0.5 mm because, with present types of laser generating apparatus, the practical lower limit to constriction of beam aperture is approximately 0.5 mm; and the upper limit is set at 5.0 mm because a beam diameter of greater than about 5.0 mm induces a large amount of penetration and further has no substantial practical use.

The power level of the laser beam is specified to be from about 80 watt/mm$^2$ to about 20,000 watt/mm$^2$, according to the above specification for the process of the present invention. The lower limit is set at about 80 watt/mm$^2$ because padding cannot be effectively performed at power levels below about 80 watt/mm$^2$; and the upper limit is set at about 20,000 watt/mm$^2$ because present day laser apparatus is not practically capable of generating higher power intensities in excess of 20,000 watt/mm$^2$.

According to the above specification for the process of the present invention, the laser beam is transversely oscillated to and fro relative to said base of aluminum type metal at an transverse oscillating frequency of above about 80 Hz, because at slower speeds it becomes possible to perform padding only at the edges of the oscillation range, and the center of the swath of the laser beam becomes underfilled. This is one characteristic of oscillating laser beams, and it happens because the intensity of the laser beam is stronger at the edges of its swath than it is at the center of said swath, and because the dead time of the laser oscillation at the ends of its oscillation is relatively long.

Moreover, during the laser beam oscillation, the irradiated portions are repeatedly overlapped.

The speed of advance of the laser beam relative to the work in the longitudinal direction is specified to be from about 100 mm per minute to about 3000 mm per minute, according to the above specification for the process of the present invention. The lower limit is set at about 100 mm per minute because penetration into the aluminum type base metal is too great at advance speeds of below about 100 mm per minute; and the upper limit is set at about 3000 mm per minute because at above this process speed padding of only the center portion of the laser beam swath is possible, and conspicuous flaws such as cracking and blow holes are created.

Further, according to a particular specialization of the present invention, the above specified and other objects are more particularly attained by a method for padding as specified above, wherein said copper type alloy material is, in step (a), applied as a powder including a binder and is then dried, before the performance of steps (b), (c), and (d); or alternatively wherein said copper type alloy material is applied automatically substantially during the performance of steps (b), (c), and (d).

BRIEF DESCRIPTION OF THE DRAWINGS

The present invention will now be described with respect to the preferred embodiments thereof, and with reference to the illustrative drawings appended hereto, which however are provided for the purposes of explanation and exemplification only, and are not intended to be limitative of the scope of the present invention in any way, since this scope is to be delimited solely by the accompanying claims. With relation to the figures, spatial terms are to be understood as referring only to the orientation on the drawing paper of the illustrations of the relevant parts, unless otherwise specified; like reference numerals, unless otherwise so specified, denote the same parts and gaps and spaces and so on in the various figures relating to one preferred embodiment, and like parts and gaps and spaces and so on in the figures relating to different preferred embodiments; and:

DESCRIPTION OF THE PREFERRED EMBODIMENTS

The present invention will now be described with reference to the preferred embodiments thereof, and with reference to the figures.

GENERAL METHOD

Figure 1:
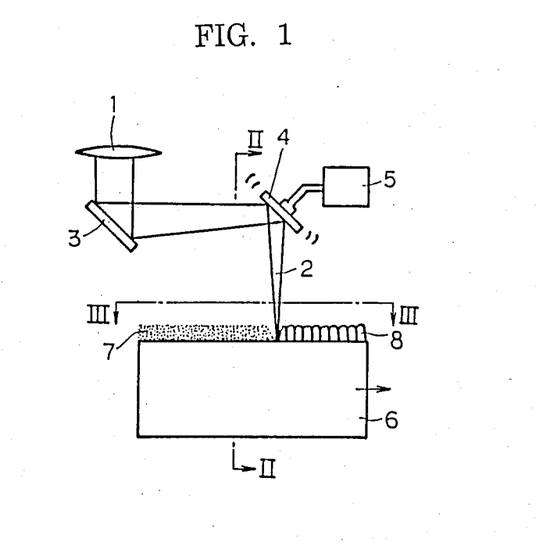
FIG. 1 is a simplified side view of an apparatus utilized for the practice upon suitable materials of any of the preferred embodiments of the padding method of the present invention.
Figure 2:
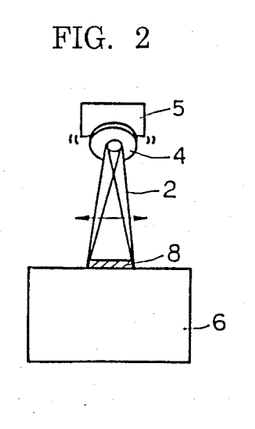
FIG. 2 is a sectional view of the FIG. 1 apparatus and materials, taken in a plane shown by the arrows II—II in FIG. 1.
Figure 3:
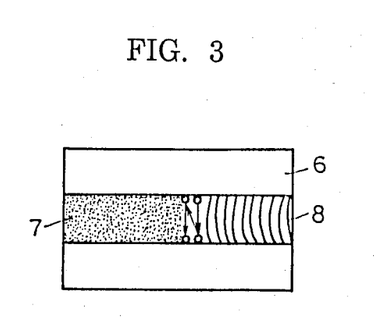
FIG. 3 is a view from on top as shown in FIG. 1 of the materials which are being processed by said apparatus, shown as seen in the direction indicated by the arrows III—III in FIG. 1.

FIGS. 1 through 3 show the general method of practice of all of the preferred embodiments of the padding method of the present invention. Referring to the view of FIG. 1 which is a general side view, the reference numeral 1 therein denotes a convex lens, and a laser beam 2 produced by a per se conventional type of laser not particularly shown in the figures (located generally above the FIG. 1 apparatus) shines through said convex lens 1 and is converted into a converging light beam thereby. This converging light beam is reflected off a reflecting mirror 3 towards an oscillating mirror 4, from which said light beam is again reflected to finally fall in a focus upon the surface of a block 6 of base metal as its rays converge. The oscillating mirror 4 is oscillated or wobbled to and fro by a so called Galvan motor 5 in a reciprocating fashion, as shown in the sectional view of FIG. 2, so as to oscillate or wobble said laser beam focus to and fro in the direction perpendicular to the drawing paper in FIG. 1 along the surface of the base metal block 6; and meanwhile said base metal block 6 is moved by a driving means, not particularly shown in the figures, in the rightwards direction as seen in FIG. 1 so as to advance the process along its surface. Thereby, as shown in the view of FIG. 3 which is a view of said base metal block 6 from on top looking downwards thereupon, said laser beam focus describes a zigzag swath along said surface of said base metal block 6. The base metal block 6 is composed of a metal of the aluminum type, and in the way of the swath described by the laser beam focus there is spread a quantity 7 of powder for padding, being a metal powder of the copper type. This quantity of padding powder 7 is melted onto the surface of the base metal block 6 by the laser beam focus as it oscillatingly describes its swath, and in the trail of said laser beam focus forms a padding layer or trail 8 on said surface of the base metal block 6, as diagrammatically shown in FIG. 3.

THE FIRST PREFERRED EMBODIMENT

In the first preferred embodiment of the padding method of the present invention, the base metal aluminum type metal block 6 was composed of a quantity of cast aluminum alloy of JIS (Japanese Industrial Standard) standard AC2C, being of approximate composition from about 2.0% to about 4.0% Cu, from about 5.0% to about 7.0% Si, from about 0.2% to about 0.4% Mg, less than about 0.5% Zn, less than about 0.5% Fe, from about 0.2% to about 0.4% Mn, less than about 0.35% Ni, less than about 0.2% Ti, less than about 0.2% Pb, less than about 0.1% Sn, less than about 0.2% Cr, and balance substantially Al. And the quantity 7 of padding powder was of approximate composition about 15.0% Ni, about 3.0% Fe, about 1.0% P, and remainder substantially Cu, and said padding powder quantity 7 was laid in a trail about 5.0 mm wide and about 0.5 mm thick upon the surface of the aluminum alloy base metal block 6.

Now, further operational details of this first preferred embodiment will be set forth. Argon gas was flowed at a pressure of about 0.5 kg per square centimeter and at the rate of about 10 liters per minute over the area including the laser beam focus, from a shielded gas supply nozzle not particularly shown in the figures. The base metal block 6 was moved in the rightwards direction as seen in FIG. 1 at a speed of about 300 mm per minute, so as to advance the process along its surface. The laser had a power output of about 2.0 Kw in the multi-mode output mode, and the diameter of the laser beam focus was approximately 1.0 mm. And this laser beam focus was oscillated to and fro by the reciprocating movement of the mirror 4 over a range of about 5 mm perpendicularly to the direction of advancing of the base metal block 6, at a frequency of about 150 Hz. Thereby, the padding layer 8 was formed in the trail of the oscillating laser beam focus along the surface of the base metal block 6.

Figure 4:
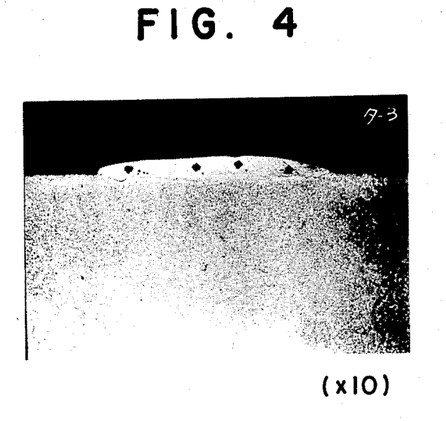
FIG. 4 is a cross sectional photographic view of the metallic structure of a padding layer produced by the practice of the first preferred embodiment of the padding method of the present invention, at a magnification of approximately 10×.
Figure 5:
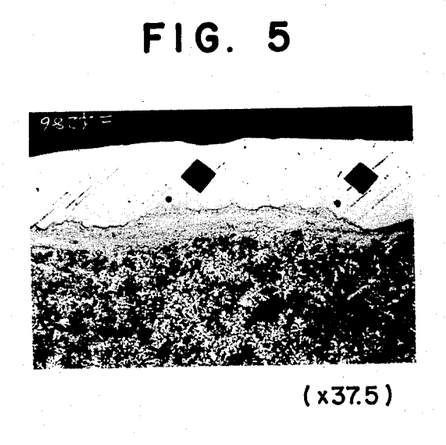
FIG. 5 is a cross sectional photographic view of the metallic structure of a joining portion of said first preferred embodiment padding layer, at a magnification of approximately 37.5×.

In FIGS. 4 and 5, there are shown cross sectional photographic views of the metallic structure of the resulting padding layer 8, and of a joining portion thereof, at magnifications of respectively 10× and 37.5×. (The square shapes in FIG. 5 are produced as artifacts of a process for measuring hardness). As will be understood from these photographs, the overlaying and padding of the copper type padding metal powder on the aluminum type base metal was effected without substantially melting the aluminum type base metal, and without creating substantial flaws.

Figure 6:
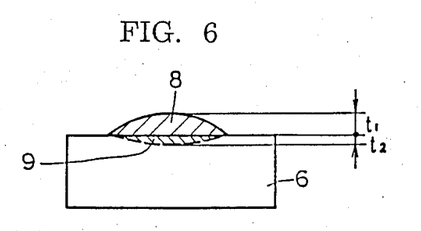
FIG. 6 is a diagrammatical sectional view of said padding layer, taken in a plane generally transverse to the longitudinal axis thereof.

In FIG. 6, there is diagrammatically shown the typical cross sectional appearance of the padding portion. In this figure, the reference numeral 9 denotes an intermediate layer composed of an alloy of the copper type padding metal powder and the aluminum type base metal, and the maximum thickness of the over layer 8 of copper type padding metal is denoted by $t_1$, while the maximum thickness of said alloy layer 9 of copper type metal powder alloyed with the aluminum type base metal is denoted by $t_2$. And, in this first preferred embodiment of the method of the present invention, the value of $t_1$ was approximately 0.3 mm, while the value of $t_2$ was approximately 0.05 mm.

THE SECOND PREFERRED EMBODIMENT

Figure 7:
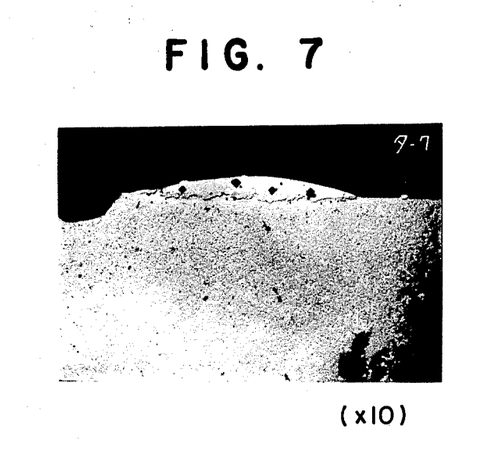
FIG. 7, similarly to FIG. 5 for the first preferred embodiment, is a cross sectional photographic view of the metallic structure of a padding layer produced by the practice of the second preferred embodiment of the padding method of the present invention, at a magnification of approximately 10×.
Figure 8:
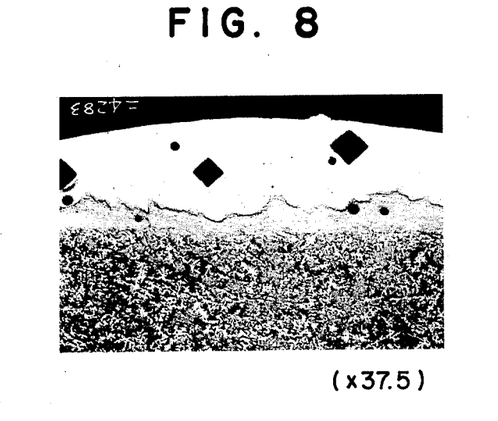
FIG. 8, similarly to FIG. 6 for the first preferred embodiment, is a cross sectional photographic view of the metallic structure of a joining portion of said second preferred embodiment padding layer, at a magnification of approximately 37.5×.

In the second preferred embodiment of the padding method of the present invention, the base metal aluminum type metal block 6 was composed of a quantity of aluminum alloy of substantially the same type as before, while the quantity 7 of padding powder utilized was this time of the so called MA - 4 type, of approximate composition about 20.0% Ni, about 4.5% Fe, about 1.0% P, and remainder substantially Cu. In other respects, this second preferred embodiment was carried out in substantially the same manner as was the first preferred embodiment. In FIGS. 7 and 8 for this second preferred embodiment, which correspond to FIGS. 4 and 5 for the first preferred embodiment, there are shown cross sectional photographic views of the metallic structure of the resulting padding layer, and of a joining portion thereof, at magnifications of respectively 10× and 37.5×. As will be understood from these photographs, the overlaying and padding of the copper type padding metal powder on the aluminum type base metal was again in this second preferred embodiment effected without substantially melting the aluminum type base metal, and without creating substantial flaws. In this second preferred embodiment, the maximum thickness $t_1$ as per FIG. 6 of the over layer of copper type padding metal was again about 0.3 mm, while the maximum thickness $t_2$ of the intermediate layer composed of an alloy of the copper type padding metal powder and the aluminum type base metal was again approximately 0.05 mm.

THE FIRST COMPARISON EXAMPLE

In the first comparison example of the padding method of the present invention, the base metal aluminum type metal block 6 was composed of a quantity of aluminum alloy of substantially the same type as before, and the quantity 7 of padding powder utilized was composed of substantially the same type of copper alloy as in the first preferred embodiment. In this first comparison example, the oscillation frequency with which the laser focus spot was wobbled to and fro transversely to the line of motion of the metal block 6 was approximately halved from what it was during the practice of the first preferred embodiment, being in this case about 70 Hz. In other respects, this first comparison example process was carried out in substantially the same manner as was the first preferred embodiment.

Figure 9:
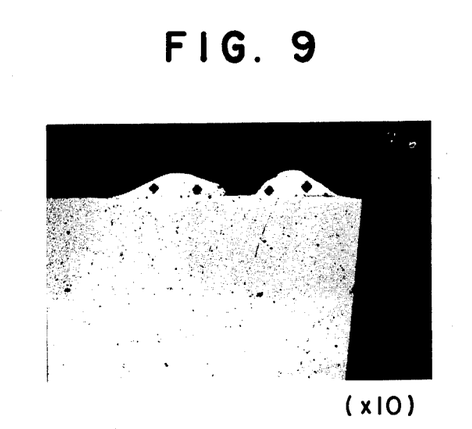
FIG. 9, similarly to FIGS. 5 and 7 for the first and second preferred embodiments respectively, is a cross sectional photographic view of the metallic structure of a padding layer produced by the practice of a first comparison example padding method (which is not an embodiment of the present invention) at a magnification of approximately 10×.
Figure 10:
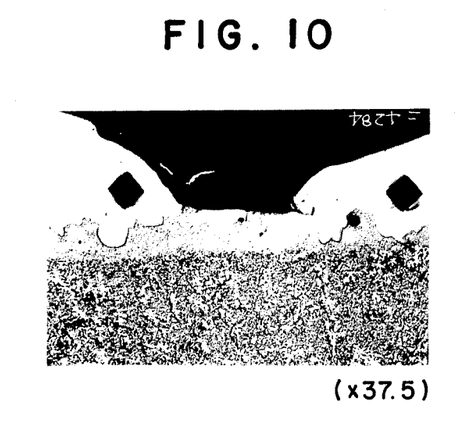
FIG. 10, similarly to FIGS. 6 and 8 for the first and second preferred embodiments respectively, is a cross sectional photographic view of the metallic structure of a joining portion of said first comparison example padding layer, at a magnification of approximately 37.5×.

In FIGS. 9 and 10 for this first comparison example, which correspond to FIGS. 4 and 5 for the first preferred embodiment and to FIGS. 6 and 7 for the second preferred embodiment, there are shown cross sectional photographic views of the metallic structure of the resulting padding layer, and of a joining portion thereof, at magnifications of respectively 10× and 7.5×. As will be understood from these photographs, the overlaying and padding of the copper type padding metal powder on the aluminum type base metal was in this first comparison example not well effected, and substantial flaws were created in the approximate center of the processed padding portion. In this first comparison example, the maximum thickness $t_1$ as per FIG. 6 of the over layer of copper type padding metal was now about 0.5 mm, while the maximum thickness $t_2$ of the intermediate layer composed of an alloy of the copper type padding metal powder and the aluminum type base metal was again approximately 0.05 mm; and these were formed in a pair on either side of the central underfilled portion.

THE SECOND COMPARISON EXAMPLE

In the second comparison example of the padding method of the present invention, the base metal aluminum type metal block 6 and the quantity 7 of padding powder utilized were again composed of substantially the same types of aluminum alloy and copper alloy as in the first preferred embodiment. However, in this second comparison example, the process conditions were further varied, in that oscillation for the laser focus spot was quite dispensed with, and the velocity of movement of the base metal aluminum type metal block 6 was of the order of 1000 mm per minute. Also, the padding powder quantity 7 was laid upon the surface of the aluminum alloy base metal block 6 in a trail this time only about 1.0 mm wide. In other respects, this second comparison example process was carried out in substantially the same manner as was the first preferred embodiment.

Figure 11:
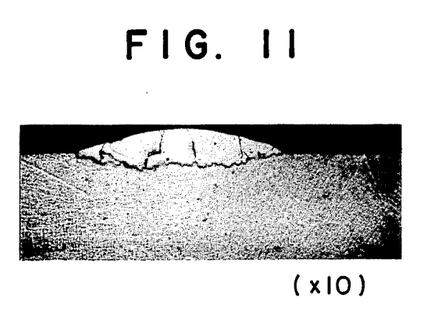
FIG. 11, similarly to FIGS. 5 and 7 for the first and second preferred embodiments and to FIG. 10 for the first comparison sample respectively, is a cross sectional photographic view of the metallic structure of a padding layer produced by the practice of a second comparison example padding method (which also is not an embodiment of the present invention) at a magnification of approximately 10×.

In FIG. 11 for this second comparison example, which corresponds to FIGS. 5 and 7 for the first and second preferred embodiments and to FIG. 10 for the first comparison example respectively, there is shown a cross sectional photographic view of the metallic structure of the resulting padding layer at a magnification of 10×. As will be understood from this photograph, the overlaying and padding of the copper type padding metal powder on the aluminum type base metal was in this second comparison example not well effected, and substantial and frequent cracks were created in the processed padding portion. In this second comparison example, the maximum thickness $t_1$ as per FIG. 6 of the over layer of copper type padding metal was about 0.3 mm, while the maximum thickness $t_2$ of the intermediate layer composed of an alloy of the copper type padding metal powder and the aluminum type base metal was now approximately 0.1 mm.

THE THIRD COMPARISON EXAMPLE

In the third comparison example of the padding method of the present invention, the base metal aluminum type metal block 6 and the quantity 7 of padding powder utilized were again composed of substantially the same types of aluminum alloy and copper alloy as in the first preferred embodiment. However, in this third comparison example, the process conditions were again varied, in that now the laser focus spot was made to be approximately 5.5 mm in diameter, while the range of transverse oscillation for said laser focus spot was now set to be about 6 mm, i.e. about 1 mm wider than the radius of said laser focus spot. In other respects, this third comparison example process was carried out in substantially the same manner as was the first preferred embodiment.

Figure 12:
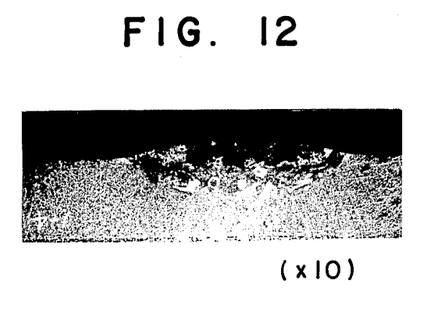
FIG. 12, similarly to FIGS. 5 and 7 for the first and second preferred embodiments and to FIGS. 10 and 11 for the first and second comparison samples respectively, is a cross sectional photographic view of the metallic structure of a padding layer produced by the practice of a third comparison example padding method (which yet again is not an embodiment of the present invention) at a magnification of approximately 10×.

In FIG. 12 for this third comparison example, which corresponds to FIGS. 5 and 7 for the first and second preferred embodiments and FIGS. 10 and 11 for the first and second comparison examples respectively, there is shown a cross sectional photographic view of the metallic structure of the resulting padding layer at a magnification of 10×. As will be understood from this photograph, the overlaying and padding of the copper type padding metal powder on the aluminum type base metal was in this third comparison example not well effected, and substantial and frequent blow holes, which were gas flaws, were created in the processed padding portion. In this third comparison example, the maximum thickness $t_1$ as per FIG. 6 of the over layer of copper type padding metal was about 0.3 mm, while the maximum thickness $t_2$ of the intermediate layer composed of an alloy of the copper type padding metal powder and the aluminum type base metal was now approximately 0.7 mm.

THE THIRD PREFERRED EMBODIMENT

Figure 13:
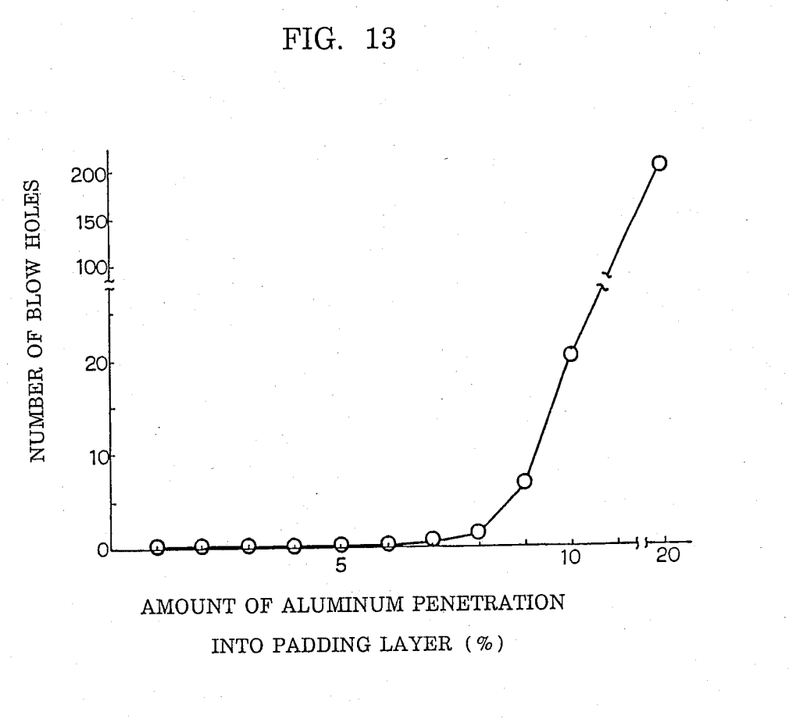
FIG. 13 is a graph showing the results of a set of tests performed by varying laser output power, in which the amount of aluminum penetration into the padding layer in percent is shown along the horizontal axis, and the number of blow holes is shown along the vertical axis, which is broken.

Next, a set of tests were performed using a general method substantially identical to that practiced as the first preferred embodiment, except that the output of the laser light source was varied. Thereby, an investigation was made into the relationship between the amount of aluminum penetration into the padding layer and the creation of blow holes. FIG. 13 shows the results of this set of tests. In this figure, the amount of aluminum penetration into the padding layer in percent is shown along the horizontal axis, and the number of blow holes is shown along the (broken) vertical axis.

From this figure, it will be clear that, when the amount of aluminum penetration into the padding layer exceeds about 8%, the number of blow holes abruptly increases. The number of blow holes is defined as the number of blow holes of diameter greater than about 0.1 mm in one bead (about 10 mm).

THE FOURTH PREFERRED EMBODIMENT

Figure 14:
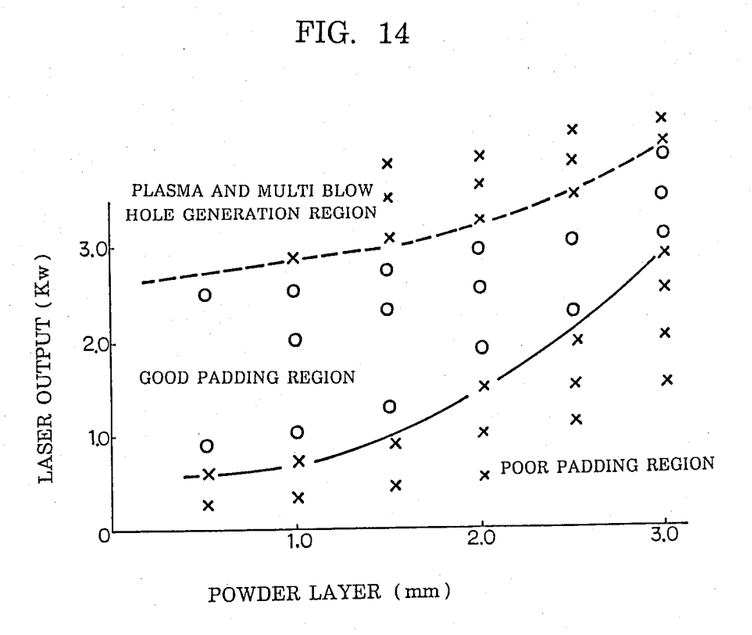
FIG. 14 is a chart showing the results of another set of tests, in which the thickness of an initially laid layer of padding powder is shown along the horizontal axis, and the power output of a laser is shown along the vertical axis.

Next, a set of tests were performed using a general method substantially identical to that practiced as the first preferred embodiment, except that the thickness of the thickness of the layer 7 of copper type powder for padding initially laid in the way of the swath to be described by the laser beam focus was varied, and also the power output of the laser was varied, thus varying the experimental parameters with two degrees of freedom. Thereby, an investigation was made into the relationship between the initial thickness of the padding layer and the power output of the laser, and the creation of blow holes. FIG. 14 shows the results of this set of tests. In this figure, the thickness of the initially laid layer of padding powder is shown along the horizontal axis, and the power output of the laser is shown along the vertical axis. And in FIGS. 15 and 16 for this fourth preferred embodiment, which respectively correspond to FIGS. 4 and 5 for the first preferred embodiment and to FIGS. 6 and 7 for the second preferred embodiment, there are shown cross sectional photographic views of the metallic structure of the resulting padding layer, and of a joining portion thereof, at magnifications of respectively 10× and 37.5×.

The region in which the results of the process were favorable is indicated in FIG. 14 by the portion between the two lines therein. Below the lower one of these lines, padding effectiveness was not good; in between these lines, padding was satisfactorily performed; and, above the upper one of these lines, a quantity of plasma was generated and the base metal was penetrated according to the plasma heat thereof, thereby making padding effectively impossible, and furthermore blow holes were created in an unacceptable number. And from the photographic views given in FIGS. 15 and 17 which relate to a one of the tests in which suitable parameter values for the padding layer thickness and the laser power were utilized of respectively about 1.0 mm and about 2.4 KW, it will be seen that in this case the over laying of the copper type padding metal on the aluminum type base metal was satisfactorily performed, without substantial melting of said aluminum type base metal and without creating substantial flaws.

THE FIFTH PREFERRED EMBODIMENT

In the fifth preferred embodiment of the padding method of the present invention, the base metal aluminum type metal block 6 was composed of a quantity of aluminum alloy of substantially the same type as before, while the quantity 7 of padding powder utilized was this time of substantially the same type as in the second preferred embodiment; thus the materials used were as in said second preferred embodiment. However, the operational parameters were varied from said second preferred embodiment, in that the thickness in which the initial layer 7 of padding alloy powder was laid upon the base metal block 6 was about 1.0 mm, and the power output of the laser was about 2.4 Kw. In other respects, this fifth preferred embodiment was carried out in substantially the same manner as was the second preferred embodiment.

Figure 15:
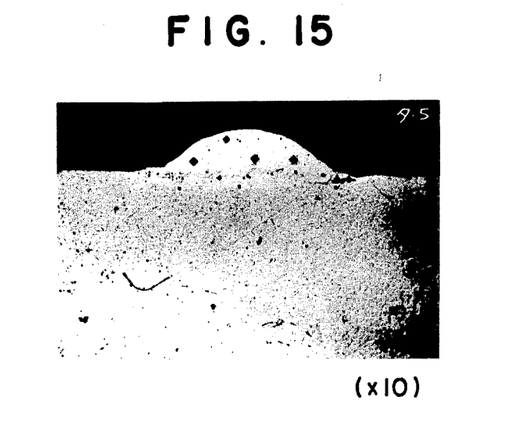
FIG. 15, similarly to FIG. 5 for the first preferred embodiment and FIG. 7 for the second preferred embodiment, is a cross sectional photographic view of the metallic structure of a padding layer produced by the practice of a fourth preferred embodiment of the padding method of the present invention, at a magnification of approximately 10×.
Figure 16:
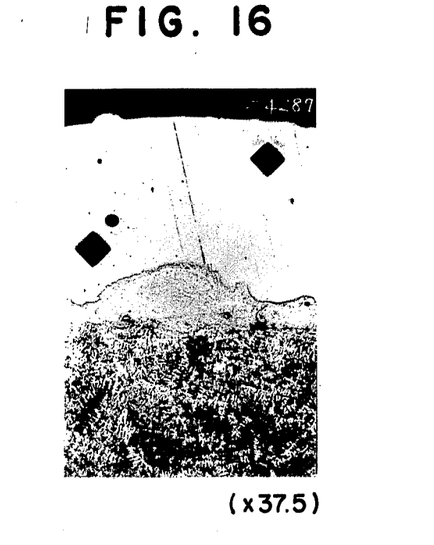
FIG. 16, similarly to FIG. 6 for the first preferred embodiment and FIG. 8 for the second preferred embodiment, is a cross sectional photographic view of the metallic structure of a joining portion of said fourth preferred embodiment padding layer, at a magnification of approximately 37.5×.
Figure 17:
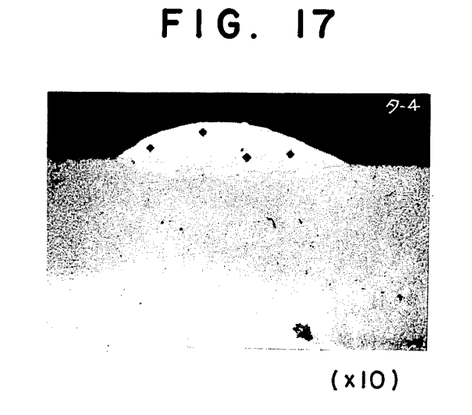
FIG. 17, similarly to FIG. 5 for the first preferred embodiment, to FIG. 7 for the second preferred embodiment, and to FIG. 15 for the fourth preferred embodiment, is a cross sectional photographic view of the metallic structure of a padding layer produced by the practice of a fifth preferred embodiment of the padding method of the present invention, at a magnification of approximately 10×.
Figure 18:
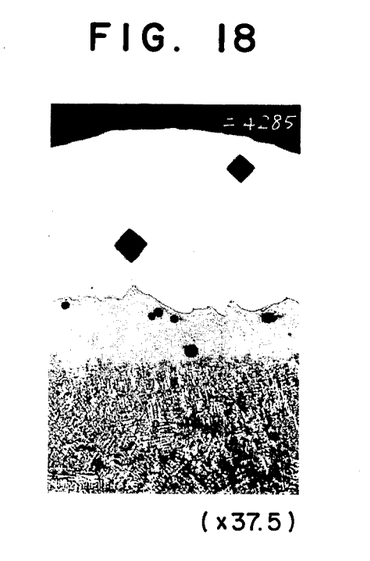
FIG. 18, similarly to FIG. 6 for the first preferred embodiment, to FIG. 8 for the second preferred embodiment, and to FIG. 16 for the fourth preferred embodiment, is a cross sectional photographic view of the metallic structure of a joining portion of said fifth preferred embodiment padding layer, at a magnification of approximately 37.5×.

In FIGS. 17 and 18 for this fifth preferred embodiment, which correspond to FIGS. 4 and 5 for the first preferred embodiment, to FIGS. 6 and 7 for the second preferred embodiment, and to FIGS. 15 and 16 for the fourth preferred embodiment, there are shown cross sectional photographic views of the metallic structure of the resulting padding layer, and of a joining portion thereof, at magnifications of respectively 10× and 37.5×. As will be understood from these photographs, the overlaying and padding of the copper type padding metal powder on the aluminum type base metal was again in this fifth preferred embodiment effected without substantially melting the aluminum type base metal, and without creating substantial flaws.

ABRASION TEST

An abrasion test was performed on samples of the laser padded copper type alloy overlayed aluminum type base metal obtained by the practice of the first preferred embodiment as described above. Simultaneously, for the purposes of comparison, samples of alloy materials of JIS (Japanese Industrial Standard) AC4C, of A-390, and of sintered Al-Si were prepared, and similar abrasion tests were performed upon all these sample materials. The abrasion tests included the carrying out of laser padding for engine valve seats utilizing the above stated materials, and then, while raising the temperature of said valve seats by using a burner to various temperatures, the comparative abrasion of said valve seats due to collision with engine valves was measured.

Figure 19:
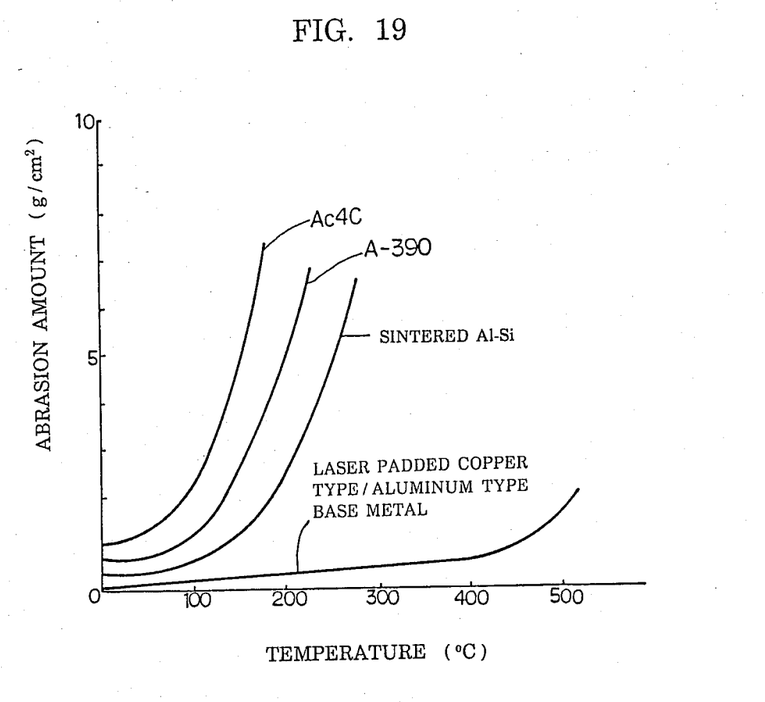
FIG. 19 is a graph showing the results of abrasion tests performed upon various material samples, including tests performed upon samples of materials made according to the process of the present invention and tests performed upon comparision material samples, in which temperature is shown along the horizontal axis and abrasion amount is shown along the vertical axis.

FIG. 19 shows these results in the form of a graph, in which the temperature is shown along the horizontal axis and abrasion amount is shown along the vertical axis. It will be clear from this graph that the materials produced according to the process of the present invention are significantly improved over the comparison material with regard to performance.

Thus, in this method according to the present invention for overlaying the powdered copper type alloy padding material over the base of aluminum type metal, in which the typical melting point of said powdered copper type alloy padding material is about 500° C. higher than that of said base of aluminum type metal, the oscillating laser light beam, concentrated to a spot from about 0.5 mm to about 5.0 mm in diameter with an output density of from about 80 watt/mm$^2$ to about 20,000 watt/mm$^2$, while being transversely oscillated over said base of aluminum type metal at an transverse oscillating frequency of above about 80 Hz, is further conveyed in the longitudinal direction of the process at a longitudinal speed of from about 100 mm per minute to about 3000 mm per minute. Thereby, only the extreme outer layer of the base of aluminum type metal is melted and is combined with the powdered copper type alloy padding material, and thus it becomes possible to satisfactorily overlay said powdered copper type alloy padding material on said base of aluminum type metal, without creating flaws in the padding layer or in the joining portion therefor, and without causing penetration of the base of aluminum type metal. Accordingly, it becomes possible to satisfactorily overlay copper type alloy padding material, which has desirable properties such as superior thermal resistance, superior abrasion resistance, and superior corrosion resistance, on a base of aluminum type metal. Further, as far as the aluminum type metal is concerned, it becomes possible not only to utilize materials of high plasticity, but also materials which are cast or die cast as well, and this expands the range of application of the padding process.

Although the present invention has been shown and described in terms of the preferred embodiments thereof, and with reference to the appended drawings, it should not be considered as being particularly limited thereby, since the details of any particular embodiment, or of the drawings, could be varied without, in many cases, departing from the ambit of the present invention. For example, although in the above disclosed preferred embodiments the base aluminum type alloy metal block 6 was manufactured by casting, in other embodiments it would be possible for said base aluminum type alloy metal block to be formed by die casting, or as a material of high plasticity. Accordingly, the scope of the present invention is to be considered as being delimited, not by any particular perhaps entirely fortuitous details of the disclosed preferred embodiments, or of the drawings, but solely by the scope of the accompanying claims, which follow.

What is claimed is:

1. A method of improving the resistivity to heat, wearing and corrosion of a surface portion of an aluminum type metal, comprising:

laying a layer of copper type alloy to a thickness of at least 0.2 mm on said surface portion of said aluminum type metal;

irradiating a laser beam, concentrated to a spot having a diameter of about 0.5 mm to about 5.0 mm and an output density of from about 80 watt/mm$^2$ to about 20,000 watt/mm$^2$ upon said layer of powdered copper type alloy, while relatively moving said laser beam and said layer of powdered copper type alloy carried on said surface portion of said aluminum type metal in a relatively longitudinal direction at a longitudinal speed of from about 100 mm per minute to 3000 mm per minute and also relatively reciprocating said laser beam and said layer of powdered copper type alloy carried on said surface portion of said aluminum type metal in a relatively transverse direction substantially perpendicular to said longitudinal direction at an oscillation frequency of about 80 Hz;

wherein the rate and dwelling of irradiation of said laser beam at each spot of said layer of powdered copper type alloy carried on said surface portion of said aluminum type metal are so adjusted that each part of said layer of powdered copper type alloy becomes substantially completely molten once with no substatial alloying with said aluminum type metal except at portions of the surface region of said surface portion of said aluminum type metal having a thickness of about 0.05 mm so that said molten layer of powdered copper type alloy forms a pad layer firmly bound to said surface portion of said aluminum type metal along a thin alloyed interface.

2. A method according to claim 1, wherein said aluminum type metal consists of from about 2.0% to about 4.0% CU, from about 5.0% to about 7.0% Si, from about 0.2% to about 0.4% Mg, less than about 0.5% Zn, less than about 0.5% Fe, from about 0.2% to about 0.4% Mn, less than about 0.35% Ni, less than about 0.2% Ti, less than about 0.2% Pb, less than 0.1% Sn, less than 0.2% Cr, and balance substantially Al, and said copper type alloy consists of about 15.0% Ni, about 3.0% Fe, about 1.0% P, and remainder substantially Cu.

3. A method according to claim 1, wherein said aluminum type metal consists of from about 2.0% to about 4.0% Cu, from about 5.0% to about 7.0% Si, from about 0.2% to about 0.4% Mg, less than about 0.5% Zn, less than about 0.5% Fe, from about 0.2% to about 0.4% Mn, less than about 0.35% Ni, less than about 0.2% Ti, less than about 0.2% Pb, less than about 0.1% Sn, less than about 0.2% Cr, and balance substantially Al, and said copper type alloy consists of about 20.0% Ni, about 4.5% Fe, about 1.0% P, and remainder substantially Cu.

* * * * *